Feb. 23, 1965   R. E. LAMME   3,170,733
WHEEL COVER WITH LOCKING MEANS
Filed July 1, 1963   2 Sheets-Sheet 1

INVENTOR.
ROBERT E. LAMME
BY
*Salvatore G. Militana*
attorney

INVENTOR.
ROBERT E. LAMME

the theft of the hub cap and wheel assembly 10 is prevented.

United States Patent Office 3,170,733
Patented Feb. 23, 1965

3,170,733
WHEEL COVER WITH LOCKING MEANS
Robert E. Lamme, 41 E. 19th St., Hialeah, Fla.
Filed July 1, 1963, Ser. No. 291,941
2 Claims. (Cl. 301—37)

This invention relates to hub caps for automotive vehicles and is more particularly directed to a theft proof hub cap wheel cover.

A principal object of the present invention is to provide a hub cap that may readily be locked in position on an automobile wheel that will prevent the unauthorized or inadvertent removal of the hub cap from the wheel.

Another object of the present invention is to provide a hub cap that is locked in place on an automobile wheel and is simple in construction, inexpensive in cost and extremely effective in preventing the pilfering of the hub cap, as well as preventing the theft of the wheel.

A further object of the present invention is to provide a hub cap that can be locked in position on a tire wheel wherein the hub cap consists of interchangeable parts for all four wheels of an automobile.

A still further object of the present invention is to provide a hub cap which locks into place on an automobile wheel and permits the flow of air to the brake drum to prevent the latter from overheating when traveling at high speeds.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

Figure 1:
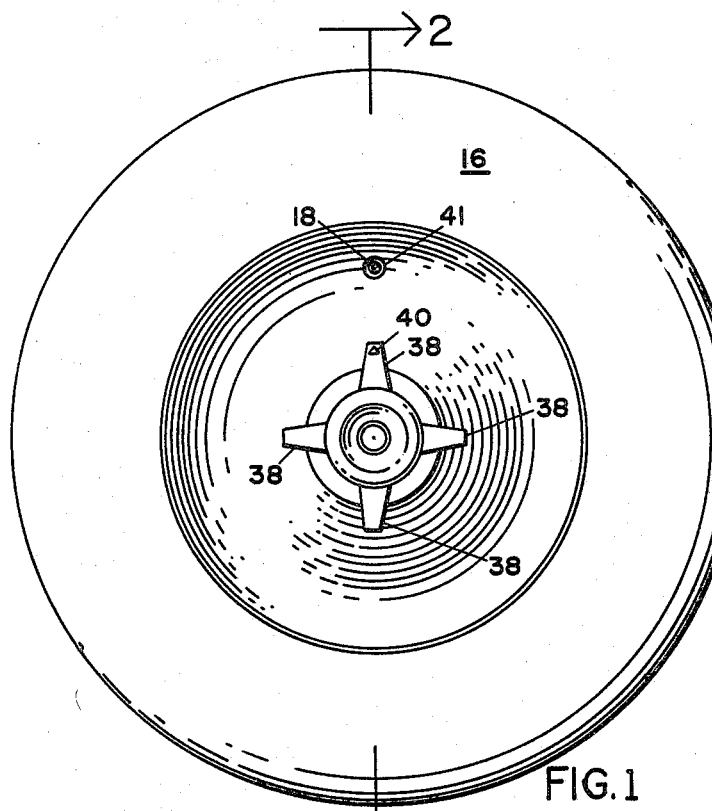
FIGURE 1 is a front elevational view of a hub cap constructed in accordance with my invention and shown mounted on a wheel.

Referring to the drawings wherein like numerals are used to designate similar parts throughout the several views, the numeral 10 refers to a conventional wheel structure of an automobile on which my hub cap 11 is mountable and locked in position thereon.

The wheel structure 10 consists of the usual brake drum 12 mounted on an axle (not shown) with a grease retaining cap 13 mounted on the drum 12. Mounted on the face of the brake drum 12 in the usual symmetrical fashion is a plurality of studs or bolts 14 for securing the wheel disc 15 thereto, the remainder of the wheel assembly 10 consisting of a tire 16 mounted on a rim 17 which is affixed to the wheel disc 15. The tire 16 is provided with the usual air valve stem 18.

My hub cap assembly 11 consists of three parts, namely a support member 20, a hub cap disc 21 and a locking member 22. The support member 20 consists of a cup shaped portion 23 which fits over and contains the axle grease cap 13 while being provided with lug members 24. The lug members 24 are provided with bores 25 for receiving the studs 14 with nuts 26 threaded thereon for securing both the wheel disc 15 and the support member 20 in position on the brake drum 12. Mounted coaxially with the cup shaped member 23 on its free end is a keeper 27 of a lock 28. The keeper 27 is hollow and cylindrical in shape and threaded as at 29 on its internal surface for receiving the threaded barrel of the barrel 30 of the lock 28. The keeper 27 of the support member 23 is also provided with a slot 31 for receiving a dog 43 of the lock 28 for locking the hub cap assembly 11 as is explained in detail hereinafter.

The disc 21 extends to the rim 17 of the wheel assembly 10 where it bears against a plurality of resilient spacers 32 for maintaining the disc 21 in spaced relation with the rim 17 to permit the flow of air therealong. The inner end of the disc 21 is provided with an opening 19 formed by a radially disposed flange portion 33 on whose inner periphery a collar 34 extends axially outwardly to form a circular seat for the locking member 22.

Figure 2:
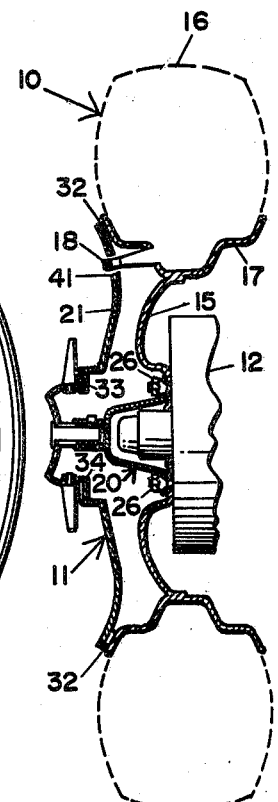
FIGURE 2 is a cross sectional view taken along the line 2—2 of FIGURE 1.
Figure 3:
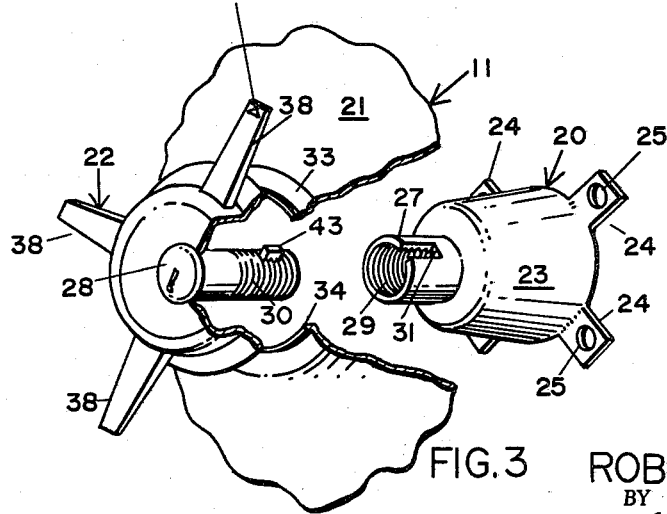
FIGURE 3 is a perspective view of my hub cap partially broken away prior to being mounted on its support.
Figure 4:
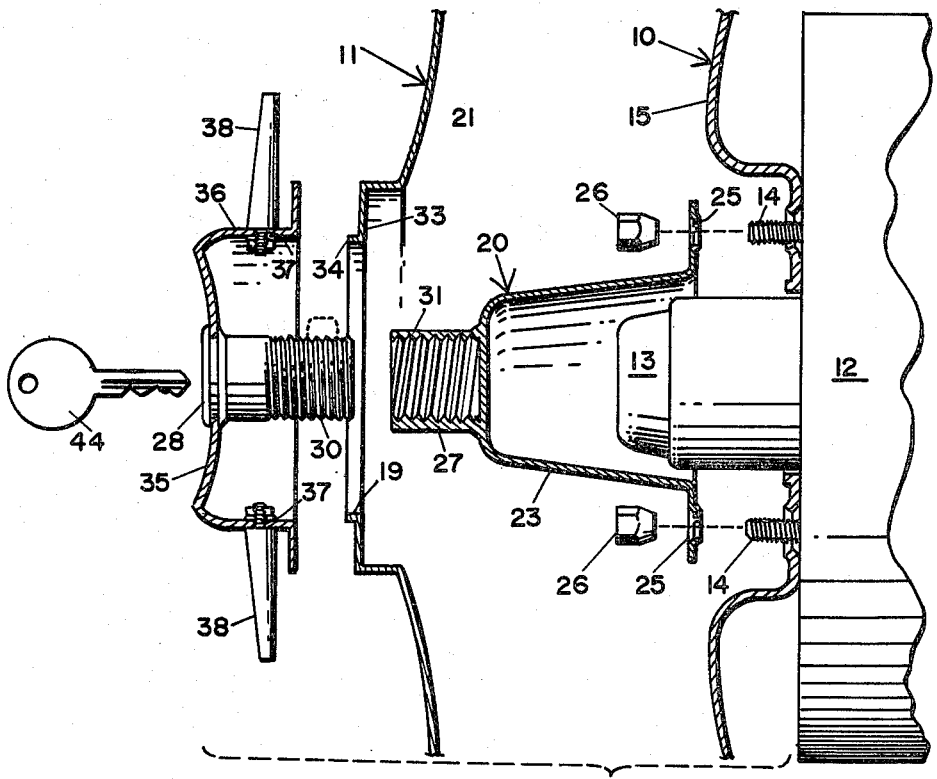
FIGURE 4 is an exploded cross sectional view similar to the cross sectional view shown by FIGURE 2.
Figure 5:
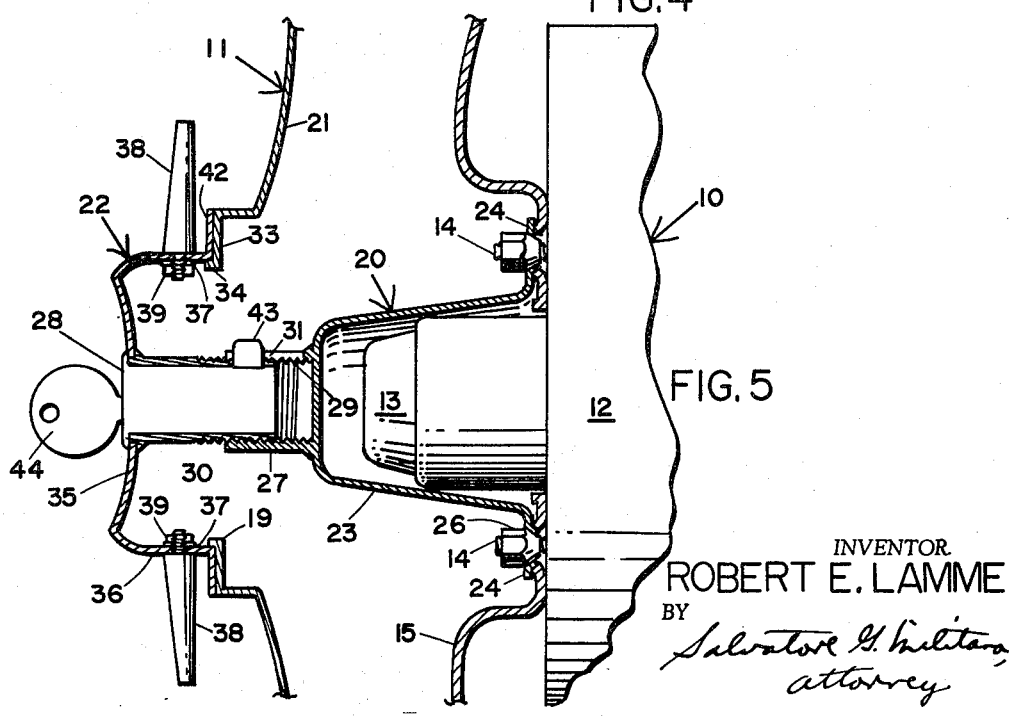
FIGURE 5 is a fragmentary enlarged cross sectional view similar to FIGURE 2.

The locking member 22 consists of a cap-like portion 35 having side walls 36 in which a plurality of openings 37 are formed. Ornamental prongs or tines 38 are mounted in the openings 37 and fastened therein by nuts 39. One of the prongs 38 is provided with an indicia or marking 40 to indicate that this prong 38 should point in the direction of a valve stem opening 41 in order to be properly assembled as explained hereinafter. The inner end of the side wall 36 of the locking member 22 is provided with a flange portion 42 which is received by the flange 33 and collar 34 of the dsic 21 to center the latter on the wheel assembly 11 and secure the disc 21 against the rim 17 as best shown by FIGURES 2 and 5.

In the usual manner of mounting my hub cap assembly 11 on the wheel assembly 10, the nuts 26 are removed from the studs 14 and the support member 20 is mounted over the grease cap 13 and the studs 14 inserted through the openings 25. The nuts 26 are then tightened on the studs 14 to tighten and fasten the wheel assembly 10 and the support member 20 to the drum 12. The wheel cover disc 21 is then placed against the rim 17 of the wheel assembly 10 with the valve stem 18 extending through the opening 41 in the disc 21. While holding the wheel disc 21 with one hand, the locking member 22 is placed through the opening 19 of the disc 21 and the threaded barrel 30 is threadedly received by the threads 29 of the keeper 27. The locking member 22 is rotated until the flange 42 is received by the collar 34 and bears tightly against the flange member 33 causing the rim of the disc 21 to compress the resilient spacers 32 against the rim 17. The rotation of the locking member 22 is arrested when the prong 38 having the indicia marking 40 is pointing directly at the valve stem opening 41. With the locking member 22 in this position relative to that of the support member 20, the dog 43 of the lock 28 will be in alignment with the slot 31 of the keeper 27. Now when a key 44 is inserted in the conventional cylindrical lock 28 and made to actuate tumblers therein (not shown) the dog 43 will slide outwardly and be received by the slot 31 to lock the locking member 22 and disc 21 to the support member 23. The positioning of the dog 43 in the slot 31 prevents the rotation of the locking member on the support member 23, which rotation must occur in order to remove the locking member 22 and the disc 21 from the wheel assembly 10 and which can be accomplished only by utilizing the key 44 to withdraw the dog 43 from the slot 31.

It is readily noted from the above description taken in connection with the drawings, that my hub cap assembly 11 is theft-proof as well as being both simple in construction and attractive in appearance. The plurality of compressed resilient spacer members 32 permit the flow of air past the rim of the disc 21 to prevent the drum 12 from becoming overheated when the automobile is travelling at a fast rate of speed. By preventing access to the nuts 26, my wheel cover assembly renders the wheel assembly theft proof.

Having described my invention, what I claim as new and desire to secure by Letters Patent of the United States is:

1. A hub cap assembly comprising a support member, outwardly extending lug portions mounted on said support member, said lug portions having bores for receiving wheel studs, a substantially cylindrical keeper mounted on said support member, said keeper member being threaded at its inner portion and provided with a slot, a substantially circular disc, said circular disc having a centrally disposed opening, a collar mounted at said opening and having an outwardly and axially extending flange mounted on a free edge of a radially disposed flange extending outwardly of said circular disc at said opening forming a seat, a substantially cylindrical locking member having an outwardly and radially extending flange member received by said seat, a barrel-type lock mounted on said locking member, said lock having a threaded portion received by said threaded keeper member and a locking bolt mounted on said lock adapted to be received by said slot for locking said hub cap assembly.

2. The structure as recited by claim 1 taken in combination with a plurality of arms mounted substantially symmetrically on said locking member, said substantially circular disc having a valve stem opening in substantial alignment with said slot on said support member, one of said arms extending in the direction of said valve stem opening and having an indicia marking thereon for aligning said lock of said locking member and said keeper.

References Cited by the Examiner
UNITED STATES PATENTS

| 757,733 | 4/04 | Frank | 70—169 |
| 1,662,482 | 3/28 | Ward | 70—171 |
| 2,329,945 | 9/43 | Schatzman | 301—37 X |
| 2,727,790 | 12/55 | Gaylord | 301—37 |

OTHER REFERENCES

| 791,863 | 3/58 | Great Britain. |
| 793,465 | 4/58 | Great Britain. |

ARTHUR L. LA POINT, *Primary Examiner.*